June 4, 1929.  H. W. TERRY ET AL  1,715,578

VEHICLE DIRECTION SIGNAL

Filed July 30, 1927

INVENTORS:
Herbert William Terry
& Albert Arthur Clarke
By: Chatwin Company
Attys Patented June 4, 1929.

1,715,578

UNITED STATES PATENT OFFICE.

HERBERT WILLIAM TERRY AND ALBERT ARTHUR CLARKE, OF PONTARDAWE, GLAMORGANSHIRE, WALES.

VEHICLE DIRECTION SIGNAL.

Application filed July 30, 1927, Serial No. 209,624, and in Great Britain November 16, 1926.

The invention relates to signalling apparatus for head lamps for vehicles and the like and although said invention is primarily intended for application to the head lamps of motor vehicles and will be described in that connection it will be understood that the same is capable of application to lamps employed on other types of vehicles and also motor boats, aircraft and the like.

The invention has for its primary object to provide a motor head lamp with means whereby the driver of the vehicle may give a signal when approaching cross-roads and an indication of the direction in which the motorist intends to turn.

For the purpose of this invention a shield or the like adapted to partly or wholly cover the area of the front of the lamp is provided and this shield is mounted in such manner that it may be placed or turned in front of the lamp so as to obscure or partly obscure the light emanating therefrom or to be removed from the path of such light when desired by the driver of the car or other person.

Figure 1:
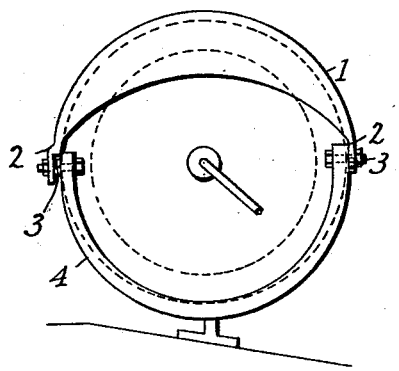
Figure 2:
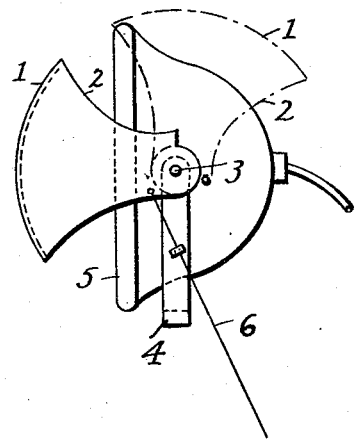
Figure 3:
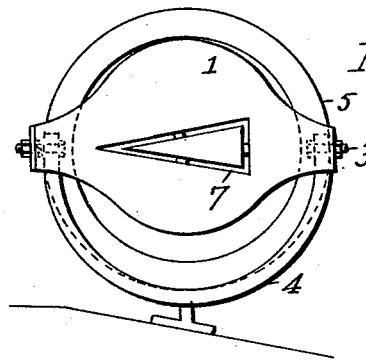

In particular said shield may consist of a plate of any suitable material which may be curved, plane, corrugated or otherwise formed and of such dimensions that when in use it will wholly or partly cover the front of the lamp and said device is preferably carried by pivotally mounted arms and operated and controlled by the means and in the manner hereinafter described with reference to the accompanying drawings, in which:

Figure 1 is a rear view of a motor car head lamp having a shield constructed according to the present invention applied thereto, Fig. 2 is a side elevation thereof and, Fig 3 is a front view thereof.

Referring to said drawings, 1 represents the said shield or plate which is according to the example illustrated carried by arms 2 whose ends are pivotally mounted at 3 upon the lamp mounting 4, or the shield 1 or said arms 2 might be otherwise mounted in such manner that the said shield 1 may normally be disposed in the position shown by the full lines in Figure 1 and the dot and dash lines in Figure 2 the light emanating from the lamp 5 will be unobstructed or turned into a position in front of the lamp 5 when in use as shown by the full lines in Figures 2 and 3.

Any suitable means, but preferably Bowden wire mechanism, connected to the arms 2 as indicated at 6, may be employed for operating the device from any suitable point of the car or the like, such, for example, as the steering post whilst means such, for example, as a pin catch or latch engaging a fixed part, or otherwise, may be employed for retaining the device in either its "on" and/or "off" position.

In order that the direction in which the driver of the car or the like intends to travel may be indicated by the device, the shield 1 may be perforated and the perforation may take the form of an arrow 7, (or there might be more than one perforation or arrow) which is illuminated by the light emanating from the lamp 5 and said perforation or perforations may be filled with coloured or other transparent material, if desired.

Or, the shield 1 may carry signs or indications other than arrows and if desired said shield 1 may be made of semi-opaque or semi-translucent material and the arrows or other signs may be of opaque character so as to show dark on a light ground instead of light on a dark ground.

It will be understood that the details of construction of the device may be modified without departing from the principle of the invention.

We claim:—

1. A vehicle direction signal for head lamps for vehicles comprising in combination, a head lamp a casing secured to said head lamp, a curved plate disposed exteriorly of said casing, a lamp mounting, arms carrying said curved plate at their ends pivoted upon said lamp mounting, means for moving said curved plate into a position in front of the head lamp and a sign upon said curved plate.

2. A vehicle direction signal for head lamps of vehicles comprising in combination, a curved plate disposed exteriorly of said head lamp normally in a horizontal position above the same, a head lamp mounting, arms carrying said curved plate pivoted upon said head lamp mounting, Bowden wire mechanism for moving said curved plate into such position that said curved plate is located in front of the head lamp and a sign upon said curved plate.

3. A vehicle direction signal for the head lamps of vehicles comprising in combination a translucent curved plate disposed exteriorly of said head lamp, arms located exteriorly of said head lamp carrying said curved plate, said curved plate being normally disposed in a position above said head lamp, opaque signs upon said curved plate, and means for moving said curved plate that the same is located in the rays of light emanating from the head lamp to indicate in front of the vehicle the direction of travel thereof.

HERBERT WILLIAM TERRY.
ALBERT ARTHUR CLARKE.